United States Patent Office 3,057,456
Patented Oct. 9, 1962

3,057,456
ENDLESS TYPE CONVEYER
Hans Heinzer, Neuhausen am Rheinfall, Switzerland, assignor to Schweizerische Industrie-Gesellschaft, Neuhausen am Rheinfall, Switzerland
Filed June 23, 1960, Ser. No. 38,166
Claims priority, application Switzerland Aug. 4, 1959
3 Claims. (Cl. 198—129)

The present invention relates to a conveyer mechanism for a processing machine, for example a wrapping machine, and the principal object is to provide a mechanism of the kind referred to, which permits the spacing of the consecutive conveyer units to be varied at will during the operation of the machine, in accordance with the length of the articles to be conveyed.

In one alternative the rotational speed of the machine is adjustable in accordance with the length of the articles to be conveyed, which in turn determines the spacing of the said conveyer units.

In another alternative the machine is left running at a constant speed regardless of the length of the articles to be conveyed, and the speed of a driving belt for the said conveyer units is varied in accordance with the rate of supply of the wrapping material which in turn depends on the length of the articles to be wrapped up.

With these and other objects in view which will become apparent later from this specification and the accompanying drawings, I provide a conveyer mechanism for a processing machine comprising in combination: an endless conveyer track, inidividual conveyer units movable independently of one another along the said conveyer track, a uniformly circulating endless conveyer member in driving connection with the said conveyer units over the effective stretch of the said conveyer track and releasing the said conveyer units in a range outside the said effective stretch, and a device operating at the rhythm of the said processing machine for returning the said conveyer units successively to the beginning of the said effective stretch after having been released at the end of the said effective stretch, and restoring the driving connection with the said conveyer member at the said beginning of the effective conveyer track.

The said conveyer units are preferably designed as carriages having runner rollers. The said conveyer member may be a roller chain or a double-V belt having wedge faces turned outwardly and wedge faces turned inwardly. The said mechanism then comprises a driving belt pulley in operative engagement with said V-belt, and a wheel having gripper teeth mounted co-axially with said belt pulley and with said teeth engaging the consecutive conveyer units, bringing the same into driving connection with the said conveyer means, i.e. with the said V-belt.

Figure 1:
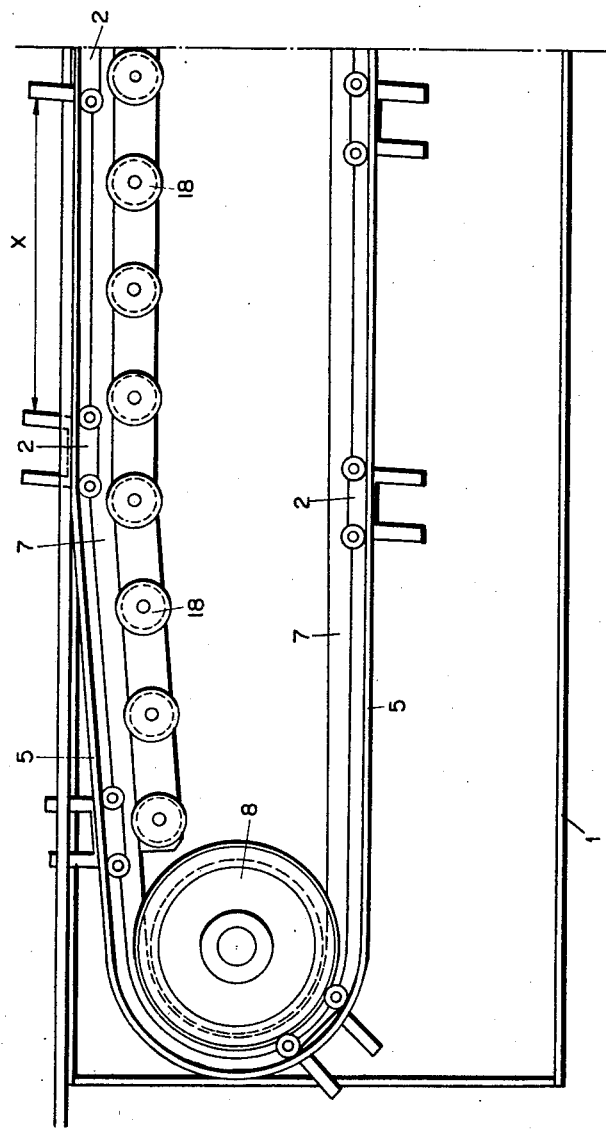
Figure 2:
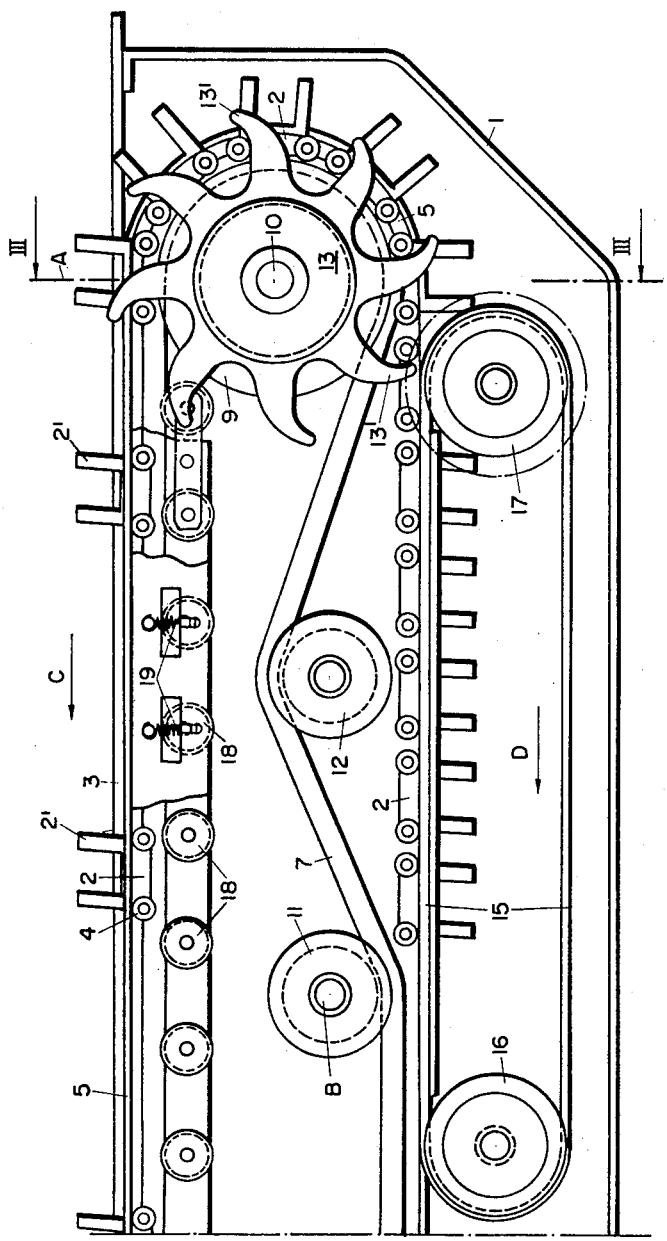
Figure 3:
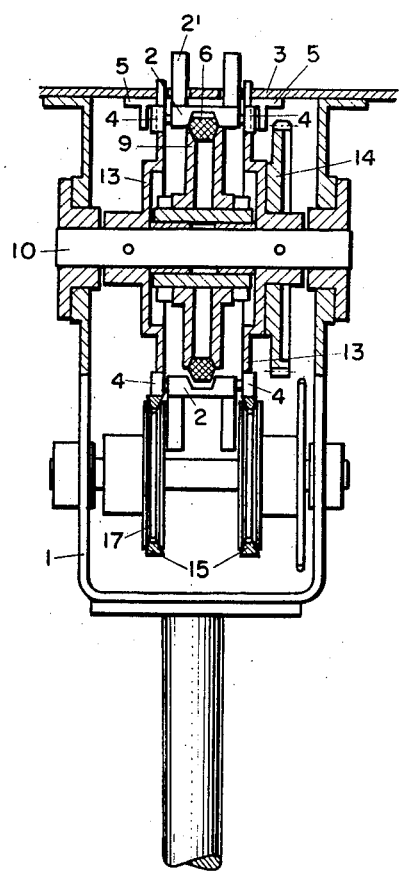

These and other features of my said invention will be clearly understood from the following description of an embodiment thereof given by way of example with reference to the accompanying drawings, in which:

FIG. 1 is a side elevation of the left hand side half of a conveyer mechanism for the supply of a wrapping-up machine, FIG. 2 is a side elevation of the right hand side half of the conveyer mechanism according to FIG. 1, and FIG. 3 is a section on the line III—III of FIG. 2.

The supply conveyer mechanism is arranged in a casing 1, the upper surface 3 of which forms the effective conveyer track from which the dog members 2' of the individual conveyer carriages 2 protrude. These conveyer carriages 2 are each provided with four rollers 4 resting on rails 5, which form the outer circumference of an endless conveyer track. The base plate of each conveyer carriage 2 has a wedge-shaped groove 6 running in the direction of conveying (FIG. 3).

The mechanism comprises moreover as a driving member for the conveyer carriages 2 including an endless double-V belt 7 of hexagonal profile, which has two V-faces converging inwardly and outwardly, respectively. This V-belt 7 runs around two belt pulleys 8, 9. The belt pulley 8 is uniformly driven in a manner not illustrated, for example from the feed of the wrapping material of the wrapping machine, while the belt pulley 9 is idly mounted on its axle 10. The V-belt 7 has its outer V-face in engagement with the grooves 6 of the conveyer carriages 2 over the effective stretch of the guide track denoted A—B as viewed in the direction of conveying (arrow C, FIG. 2). In order to establish this engagement it is forced upwardly against the conveyer carriages 2 by a series of rollers 18, which are under the bias of springs 19. A the point B the V-belt 7 is lifted away from and out of range of the conveyer carriages 2 by means of two deflector rollers 11, 12.

On the axle 10 moreover outside the belt pulley 9 and co-axially with the same two drive wheels 13 are provided and these drive wheels 13 are formed with gripper teeth 13'. The wheels 13 are mounted and fixedly keyed to said axle. To one of these drive wheels 13 a gear wheel 14 is attached, which is rotated in a manner not shown in detail continuously or stepwise at the rhythm of the wrapping machine and which drives the driving wheels 13 continuously or stepwise. The gripper teeth 13' are so designed, that they are capable of engaging at any time between the two pairs of rollers 4 of the conveyer carriages 2, so that the same are advanced stepwise in unison with the driving wheels 13, until they move into engagement with the V-belt 7 at the point A and are carried along by the same along the effective stretch of the conveyer track. Between the point B and the point A the conveyer carriages 2 are however not in driving engagement with the V-belt 7.

In order that the conveyer carriages 2 may proceed from the point B, where they are released from the V-belt 7, until they move into the range of the gripper teeth 13', the rails 5 are replaced in this zone by two V-belts 15. The same run over two belt pulleys 16, 17 which in a runner not illustrated in detail, for example by a link chain, are in driving connection with the driving wheels 13. The V-belts 15 accordingly circulate stepwise or continuously in the direction of the arrow D and advance the conveyer carriages into the range of the driving wheel 13.

The manner of operation of this mechanism is as follows: in order to vary the spacing X between the individual conveyer carriages 2, the rotational speed of the stepwise rotating driving wheel 13 is varied, while the speed of circulation of the V-belt 7 remains constant. When the rotational speed of the drive wheel 13 is increased the spacing X is shortened, and conversely the same is lengthened when said speed is reduced. The same effect may be attained, when the rotational speed of the driving wheel 13 is kept constant while the speed of circulation of the V-belt 7, i.e. the rotational speed of the driven belt pulley 8 is varied. In this manner it is possible to adapt the spacing X of the individual conveyer carriages 2 at will and continuously to the requirements arising during the operation of the wrapping machine.

The first alternative is used when the rotational speed of the machine is adjustable in accordance with the length of the articles which actually determines the spacing of the conveyer units. The second solution comes into question, when a variation of the rotational speed of the machine in accordance with the length of the articles is undesirable and the machine operates always at the same speed. Here the adjustment of the speed of the V-belts is controllable, for example in accordance with the rate of supply of the wrapping material, which likewise varies in accordance with the length of the articles.

While I have herein described and illustrated in the accompanying drawings what may be considered a typical and particularly useful embodiment of my said invention, I wish it to be understood that I do not limit myself to the particular details and dimensions described or illustrated; for obvious modifications will occur to a person skilled in the art.

What I claim as my invention and desire to secure by Letters Patent is:

1. A conveyor mechanism for a processing machine, such as a wrapping machine, comprising in combination: an endless conveyor track, individual conveyor units movable independently of one another along said conveyor track, a uniformly circulating conveyor belt having opposed V-shaped surfaces with one of said V-shaped surfaces directed outwardly and the other V-shaped surface directed inwardly, said endless conveyor belt being adapted to frictionally engage and effect a driving connection with said conveyor units over the effective flight run of said conveyor track and arranged to release said conveyor units in a range remote from said effective conveyor flight run, and a device operating at the rhythm of said processing machine for feeding the conveyor units successively to the beginning of said effective conveyor flight run after they have been released at the end thereof and means for restoring the driving connection with said conveyor member at the beginning of the effective conveyor flight run.

2. A conveyor mechanism for a processing machine such as a wrapping machine, comprising in combination: an endless conveyor track, individual conveyor units movable independently of one another along said conveyor track a uniformly circulating endless conveyor belt of double V-section providing inwardly and outwardly extending wedge-shaped surfaces, a driving belt pulley in operative engagement with said double V-belt, means for frictionally urging said endless conveyor belt into frictional driving engagement with said conveyor units over the effective run of said conveyor track, said conveyor units being released from driving engagement with said conveyor belt in a range remote from the effective run of said conveyor track, and a wheel having gripper teeth mounted co-axially with said belt pulley for engaging said conveyor units successively and feeding the same to the effective run of the conveyor track after having been released at the end of said effective conveyor run.

3. A conveyor mechanism for a processing machine such as a wrapping machine, comprising in combination: an endless conveyor track, individual conveyor units movable along said conveyor track independently of one another, a uniformly circulating endless conveyor belt having inwardly and outwardly directed V-shaped surfaces, a driving pulley in operative engagement with said double V-belt, the outwardly directed V-surface of said conveyor belt being adapted to frictionally engage a correspondingly shaped surface in the conveyor units and effect a driving connection therebetween over the effective conveyor run of said conveyor track, means for moving said conveyor belt out of engagement with said conveyor units at a point remote from said effective conveyor run, and a wheel having gripper teeth mounted co-axially with said conveyor belt pulley and operating at the same rhythm of said processing machine so that the gripper teeth will successively engage the conveyor units and move the same into driving engagement with said conveyor belt at the beginning of said effective conveyor run after their release at the end of said effective conveyor run and means for urging said conveyor belt into driving engagement with said conveyor units at the beginning of the effective conveyor run.

References Cited in the file of this patent

UNITED STATES PATENTS 2,823,811  Temple _____ Feb. 18, 1958